United States Patent [19]

Smith et al.

[11] 4,024,229

[45] May 17, 1977

[54] PRODUCTION OF POLYSULFIDE WITH PTFE COATED CATALYST

[75] Inventors: Glen C. Smith; Frederick W. Sanders, both of Chillicothe, Ohio

[73] Assignee: The Mead Corporation, Dayton, Ohio

[22] Filed: May 9, 1974

[21] Appl. No.: 468,471

Related U.S. Application Data

[63] Continuation-in-part of Ser. No. 87,504, Nov. 6, 1970, abandoned.

[52] U.S. Cl. .............................. 423/562; 162/82; 252/447; 423/642
[51] Int. Cl.² ................... C01B 17/34; C01B 17/42
[58] Field of Search .......................... 252/444, 447; 117/135.5, 228; 136/121; 106/307; 423/562, 542, 561; 204/174, 180 P, 284; 162/82; 427/113

[56] References Cited

UNITED STATES PATENTS 3,536,537  10/1970  Solomon ........................... 136/120

Primary Examiner—L. DeWayne Rutledge
Assistant Examiner—Michael L. Lewis
Attorney, Agent, or Firm—Biebel, French & Nauman

[57] ABSTRACT

Sodium polysulfide is prepared by the oxidation of sodium sulfide or sodium hydrosulfide, and by using new procedures and systems described, the production of thiosulfate can be markedly reduced and, in some cases, eliminated. The oxidant is air, oxygen or oxygen in mixture with other gases, the reductant is aqueous sodium sulfide or sodium hydrosulfide and the reaction is carried out with both reactants in non-flooded contact with a solid catalyst material, of which a typical example is a particulate carbon treated with polytetrafluoroethylene (PTFE). The reaction is typically conducted at atmospheric pressure and without the application of heat, with the oxidant and the reductant being in interfacial contact with each other, but only, insofar as possible, at sites where both are simultaneously in contact with a catalyst which is prevented from being flooded by either the oxidant or reductant. Sodium polysulfide and sodium hydroxide are produced, and are useable in treatment of lignocellulose materials. Various arrangements, materials and processes are also disclosed.

7 Claims, 10 Drawing Figures

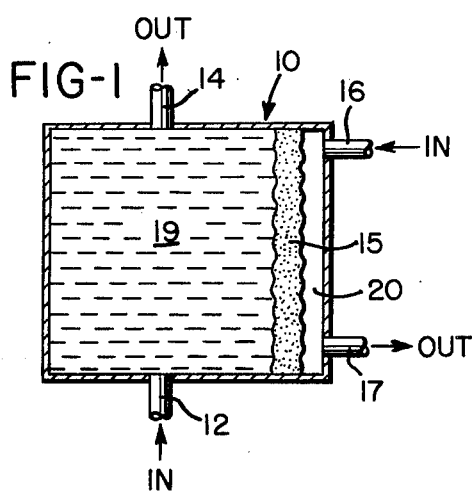
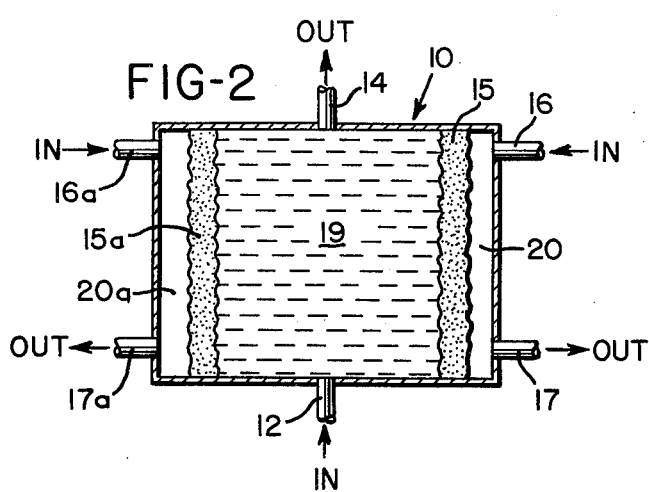
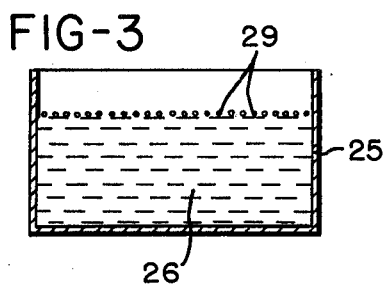
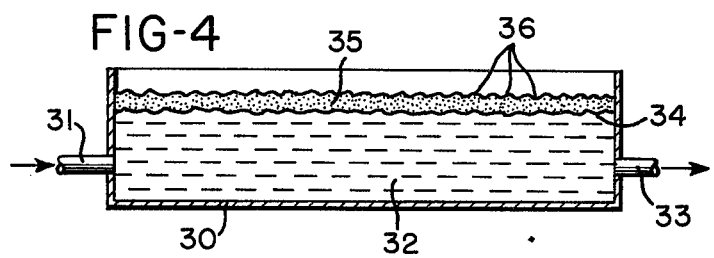
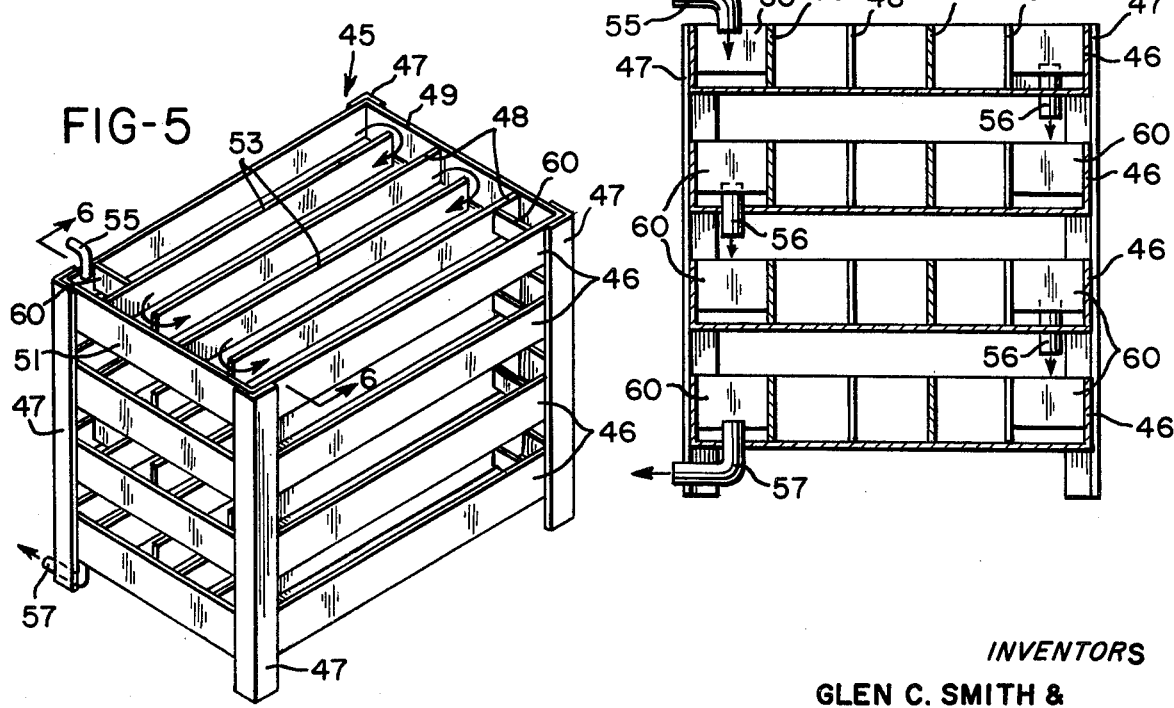

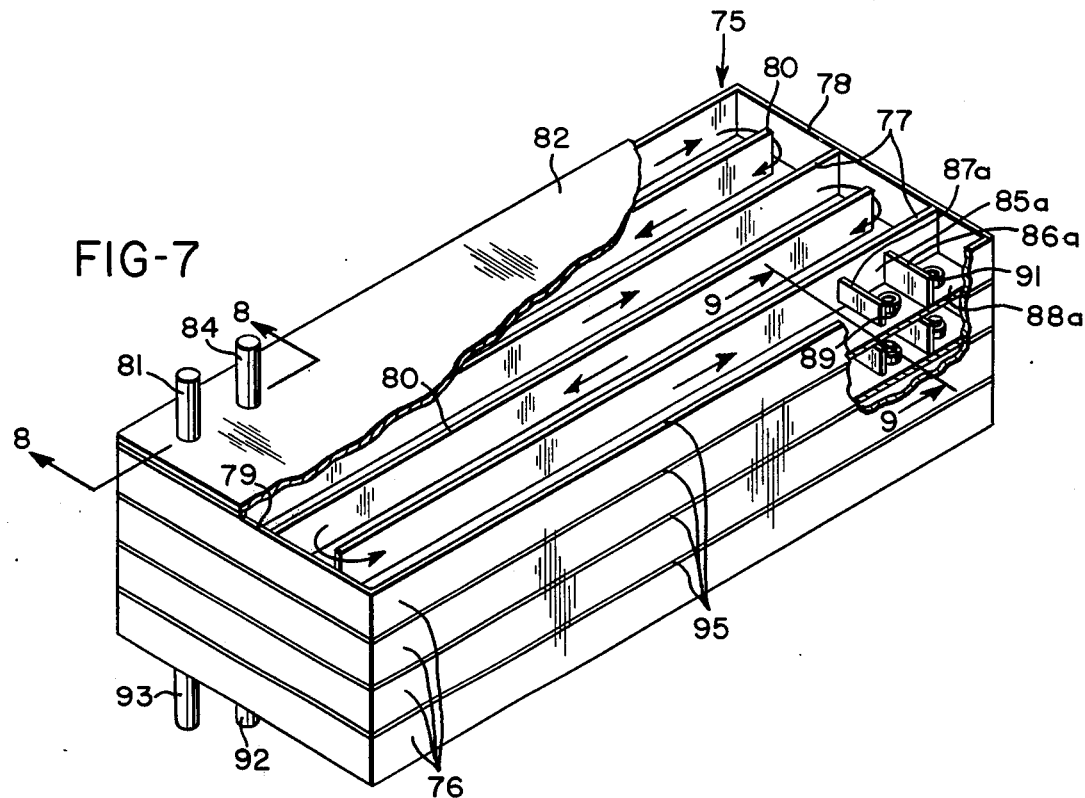
FIG-7
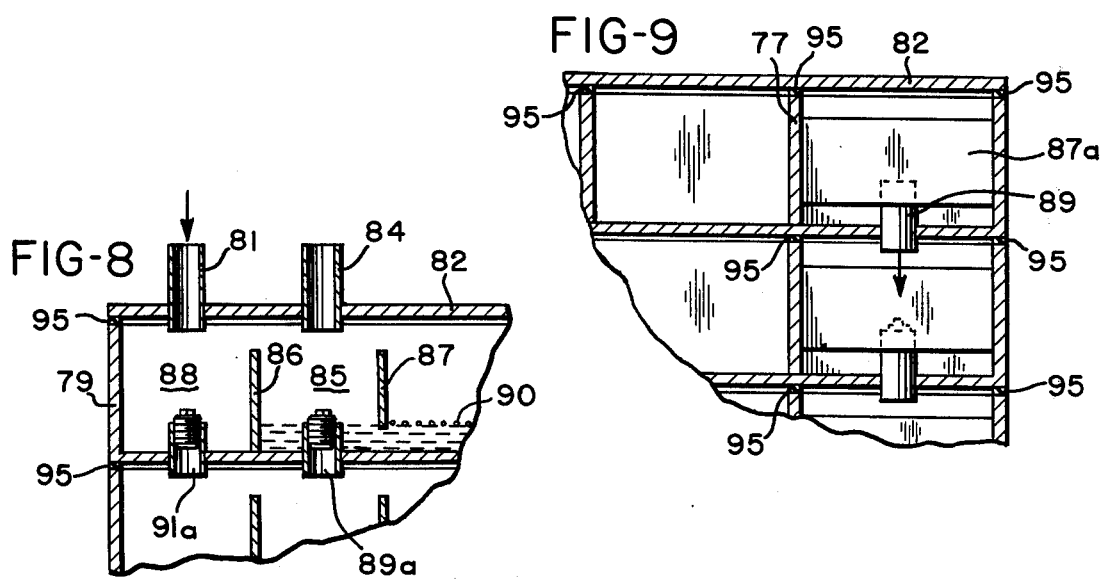
FIG-8
FIG-9

PRODUCTION OF POLYSULFIDE WITH PTFE COATED CATALYST

CROSS-REFERENCE TO RELATED APPLICATIONS

This application is a continuation-in-part of application Ser. No. 87,504, filed Nov. 6, 1970 (abandoned).

Reference is made to application Ser. No. 87,503, filed Nov. 6, 1970, now abandoned in favor of continuation-in-part application Ser. No. 356,469, filed May 2, 1973 which in turn has been abandoned in favor of continuation application Ser. No. 517,246, filed Oct. 23, 1974.

Reference is also made to companion application Ser. No. 468,470, filed on even date herewith as a continuation-in-part of Ser. No. 87,504, filed Nov. 6, 1970, of which this application is a continuation.

BACKGROUND OF THE INVENTION

This invention relates to a system for the production of sodium polysulfide for use in treatment of lignocellulose materials and more particularly to a basically new redox system for the simultaneous production of sodium polysulfide and sodium hydroxide with a minimum of by-product thiosulfate from sodium sulfide or sodium hydrosulfide.

Description of the Prior Art

A variety of basically different procedures are known in which sodium polysulfide is obtained, either as a major product or as a minor by-product. These include electrochemical operations, redox processes and catalytic processes.

U.S. Pat. No. 3,249,522 discloses the use of hydrogen sulfide gas as the fuel in an electrochemical fuel cell, the products being sulfur, sulfides, polysulfides, and the generated current. The fuel cell itself includes an anode and a cathode separated by an ion exchange membrane, the anode being carbon catalyzed with platinum and the cathode being carbon catalyzed with nickel. Hydrogen sulfide is fed into the anode compartment and oxygen is introduced into the cathode compartment, the electrolyte being alkaline. The process involves oxidation of the hydrogen sulfide at the anode and reduction of oxygen at the cathode.

U.S. Pat. No. 3,409,520 describes an electrochemical system for removal of hydrogen sulfide gas from a natural gas mixture, the system being electrolytic in nature. The electrolysis cell includes an anode spaced and separated from the cathode by a diffusion barrier. With an acid electrolyte, the anodic oxidation product is sulfur while hydrogen gas is formed at the cathode. When the electrolyte is basic, the anodic oxidation product is polysulfide with hydrogen gas formed at the cathode. This system requires the application of current from an external source.

The catalytic oxidation of hydrogen sulfide in an alkaline solution to produce sulfur is described in U.S. Pat. No. 3,471,354. The catalyst is a phthalocyanine complex which is soluble in aqueous sulfide and insoluble in sulfide-free aqueous solutions, the catalyst being recovered as a curd and recycled.

U.S. Pat. No. 2,135,879 describes the air oxidation of calcium hydrosulfide, i.e., the reaction product of lime or calcium hydroxide and hydrogen sulfide, using a nickel sulfide catalyst which produces polysulfide, thiosulfate and sulfate in the ratio of 74:73:17. To increase the amount of polysulfide, 0.1% to 1.0% of hydrogen sulfide gas is admixed with the air oxidant to provide an excess of hydrogen sulfide in the oxidation stage.

German patent No. 326,159 also produces polysulfide from hydrogen sulfide by dissolving it in alkali and oxidizing in the presence of a catalyst such as iron, manganese or aluminum oxides or hydroxides.

It is known, and the prior art has attempted in various ways to generate polysulfide from the various forms of sulfur available in the pulping and recovery cycle. For example, U.S. Pat. No. 3,210,235 treats a portion of the green liquor to produce hydrogen sulfide by a carbonation procedure, the hydrogen sulfide being thereafter stripped and converted, at a high temperature and in the presence of catalyst, to produce elemental sulfur a portion of which is added to the pulping liquor and a portion of which is converted to sulfur dioxide used in the oxidation of hydrogen sulfide.

U.S. Pat. No. 3,331,732 treats green liquor in a scrubber with flue gas, the resulting product is then treated in a stripper to produce hydrogen sulfide gas which is then processed in a Claus type reactor.

U.S. Pat. No. 3,560,329 and companion U.S. Pat. No. 3,650,889 treat black liquor, prior to combustion in a recovery furnace, with sodium bicarbonate to produce hydrogen sulfide gas which is then treated in a Claus reactor to produce elemental sulfur. By treating black liquor, the sulfidity thereof is said to be reduced, thus reducing the sulfidity of the liquor being burned in the recovery furnace, thereby reducing sulfur losses.

U.S. Pat. No. 3,525,666 reuses the sulfur content of black liquor to prepare white liquor for kraft processing by carbonating the black liquor to a pH below 11 using combustion gases containing at least 15% $CO_2$. Hydrogen sulfide gas is stripped and oxidized to sulfur using a Claus process reactor.

U.S. Pat. No. 3,554,858 treats black liquor to an acid pH to liberate hydrogen sulfide and to precipitate the organic material which is thereafter separated to produce a first mother liquor. A second mother liquor is obtained after the smelt is added to water, the two liquors being combined and recausticized to form a lime mud and an aqueous sodium hydroxide solution, hydrogen sulfide being added to the hydroxide solution to produce white liquor. Reference is also made to U.S. Pat. No. 3,594,125.

In the processing of pulp, it is known that the use of sodium polysulfide, (hereinafter referred to as polysulfide), in the cooking liquor increases yield, (see U.S. Pat. No. 3,216,887 to Landmark, and the patents and publications discussed therein). Various procedures for forming polysulfide are discussed including, for example, dissolving sulfur in aqueous sodium hydroxide or sulfide solution. Also discussed is the production of polysulfide by the air oxidation of neutral sodium hydrogen sulfide. Landmark also states that white liquor is strongly alkaline and its sulfide is not easily oxidized by air. Moreover, oxidation of white liquor will not give sodium polysulfide but sodium thiosulfate. He proposes to admix white and black liquor and to oxidize the sulfide to produce polysulfide and thiosulfate. A similar process is disclosed in U.S. Pat. No. 3,723,242 where a black liquor-white liquor mixture is oxidized in the presence of the wood chips.

Canadian patent No. 814,882, and the reference material cited therein, also describes the advantages of polysulfide pulping, and specifically describes an adsorption process for the preparation of polysulfide pulping liquor in which hydrogen sulfide gas is adsorbed on activated carbon in the presence of air or oxygen, the hydrogen sulfide being oxidized to elemental sulfur which is deposited on the carbon. Once the carbon is saturated with sulfur, the sulfur is leached out by an alkaline solution. Best results are said to be obtained by saturating the hydrogen sulfide with water vapor prior to contact with the carbon and by removal of the formed sulfur by alkaline leaching in order to leave some alkaline residue for neutralization of the sulfuric acid formed during the reaction.

U.S. Pat. No. 3,470,061 describes generation of polysulfide by use of insoluble manganese oxide compounds which act as the oxidizing agents and which are regenerated after use by heating in air to raise the manganese oxidant to the next higher oxidation state. This latter patent also discusses the shortcomings of the procedures described in U.S. Pat. No. 3,216,887, supra, as well as the procedures described in U.S. Pat. Nos. 3,210,235 and 2,944,928.

It has also been suggested that polysulfide can be produced by electrolytically oxidizing a sulfide solution obtained from the green liquor by an evaporator crystallizer which separates the green liquor into a sulfide solution and a carbonate solution. See, Venemark, "Some Ideas on Polysulfide Pulping," *Svensk Papperstidn*, 67 (1963), pp. 157–166. As an alternative to the electrolytic oxidation of the sulfide solution, it is proposed that the hydrogen sulfide can be expelled with carbon dioxide and converted to sulfur.

U.S. Pat. No. 3,423,180 to Hoekstra discloses a process for oxidizing a sulfide compound to elemental sulfur, sulfite, thiosulfate, sulfate, or dithionate by contacting the sulfide solution with oxygen in the presence of a solid catalyst and a sulfur solvent. The catalyst may be a metallic sulfide or a metal phthalocyanine on a suitable carrier material. A further Hoekstra U.S. Pat. No. 3,457,046, teaches how polysulfide can be produced in such a system by controlling the amount of oxygen entering the oxidation zone.

In the field of catalysis, it is known that certain finely divided materials increase the rate of reaction. For example, finely divided nickel and cobalt have been used as catalysts in the hydrogenation of vegetable oils. Improved results are said to have been obtained by the use of thin foils or flakes which remain more easily dispersed than do fine powders (see for example U.S. Pat. No. 1,083,930).

U.S. Pat. No. 1,146,363 describes the use of carbon in granular form as a catalytic or purifying agent, the carbon being in a column or percolator in which liquid is flowed through a bed of granular carbon.

U.S. Pat. No. 2,365,729 describes the oxidation of an acid solution of ferrous sulfate to ferric sulfate in which granular activated carbon containing absorbed oxygen or air is used as the catalyst. The carbon is suspended in the liquid, and the oxidant is bubbled through the suspension, or the oxidant is diffused through the liquid by a diffuser made of carbon, or the liquid and oxidant are concurrently passed through a packed tower or column.

U.S. Pat. No. 2,459,907 of Jan. 25, 1949, relates to a method of conducting chemical reactions by passing the reactants through a porous carbon column made by mixing carbon particles and pitch binder together, forming by heat and pressure, and baking to graphitize the carbon. The carbon column may contain catalytic inclusions. The purpose of the column is to reduce the thickness of the liquid reactant at the catalytic surface.

U.S. Pat. No. 1,284,488 of Nov. 12, 1918, also discloses a method of reducing the thickness of a liquid reactant on a catalytic surface. This is done by centrifugal force, which thins the liquid film and shortens the diffusion time necessary for the gaseous reactant to reach the surface of the catalyst.

Reference is also made to U.S. Pat. No. 3,666,405 of May 30, 1972, relating to reaction between two phases, one of which has a higher wettability with respect to a porous body. Preferably, the porous body has both large and small pores so that when the fluid phase with the lower wettability is introduced under a higher hydrostatic pressure than the fluid phase having the higher wettability, the smaller pores will be filled with the higher wettability fluid and the larger pores with the lower wettability fluid, thus forming a large interface between the two fluid phases. Alternatively, it is disclosed that the porous body may have a multiplicity of uniformly sized pores of two different wetting properties. It is stated that this may be achieved by constructing the porous body of a mixture of metal and resinous material or making the porous body of or coating the interior of the pores with various hydrophobic resinous material.

Canadian patent No. 700,933 of Dec. 29, 1964, describes a system for the electrolysis of sodium chloride brine in which the cathode is porous and supplied with oxygen gas to prevent formation or evolution of hydrogen. In one form, the cathode compartment contains a slurry of particulate solids which is agitated by the air stream or by mechanical agitation. The particulate material may be graphite and coated with a hydrophobic material such as tetrafluoroethylene.

The advantages of polysulfide treatment of lignocellulose material are well recognized in the art. Presently, there is at least one pulp mill utilizing polysulfide pulping in which sulfur is added to kraft pulping liquor to form polysulfide. The extra sulfur added is lost from the chemical recovery process. In the one mill reported to be utilizing polysulfide pulping, addition of 2.2% of elemental sulfur improves the yield by between 3% to 4%, both based on dry wood chips.

The present invention provides a simple and efficient polysulfide generating system and thus fulfills a need in the pulping industry by providing a polysulfide generating and recovery system adaptable to present kraft pulping and recovery procedures and equipment.

Summary of the Invention

In accordance with the present invention sodium polysulfide and sodium hydroxide are prepared by a reduction-oxidation process in which sodium sulfide or sodium hydrosulfide in an aqueous solution are oxidized in the presence of a solid electronically conductive catalyst material. The oxidant is oxygen, air or a mixture of oxygen with other gases, while the reductant is the sulfide or hydrosulfide in an aqueous solution. The electronically conductive catalyst, which is relatively inert chemically with respect both to the oxidant and the reductant, is believed to function by conducting electons from contacting reductant molecules or ions to contacting oxidant molecules or ions, thus expediting the transfer of electrons involved in the reaction. Unlike known electrochemical systems, e.g., electrolysis or fuel cells in which the anode and cathode are separated by barriers or membranes and wherein oxidation takes place on one electrode and reduction on the other, the system of the present invention involves contiguous reactions of oxidation and reduction at the catalyst material and does not require the use of membranes or barriers.

The reactions involving oxidation of sulfide are known for their tendency to produce predominately thiosulfate instead of polysulfide especially if the reductant is strongly alkaline. In contrast, the new redox systems of this invention produce predominantly polysulfide, production of thiosulfate being minimal. This is accomplished in accordance with this invention by bringing the oxidant and the reductant simultaneously into contact with the catalyst and into contact with each other, but minimizing the contact of the oxidant with the reductant except at the locus where both are in contact with the catalyst material. In such systems according to the invention, the oxidant and reductant form an interface, the catalyst material being positioned at the interface and maintained simultaneously in contact with both the reductant and oxidant.

An important aspect of the present invention is preventing the solid catalyst material from being in exclusive contact with the liquid reactant, that is, the reductant. Likewise the solid catalyst material must not be in exclusive contact with the gaseous reactant, that is, the oxidant. When used in describing this invention, the term "flooded" means that the catalyst material is in exclusive contact with either oxidant or reductant. If the catalyst material of the present invention is flooded, the preferred polysulfide producing reactions stop for all practical purposes.

Considerations in catalysis and electrochemistry may be applicable in some degree to the new discoveries of this invention. For example, if the catalyst material of the present invention is considered an electrode, even though no lead wires are attached for supplying or removing electrical current, both oxidation and reduction take place at the same "electrode," i.e., one member acts as both an anode and a cathode and both the oxidation product and the reduction product are generated at the same electrode member. While such a member could be characterized as a "mixed potential electrode," the kinetics of the system of the present invention are not sufficiently defined or understood as to provide a complete explanation of the reaction mechanism. Similarly, in view of the solid nature of the conductive material, elements of heterogeneous catalysis would seem to be present since the effect of the present system is to increase the rates of the polysulfide producing reactions substantially above those possible in the absence of the solid catalyst material. Characterization by a term such as heterogeneous catalysis, likewise, does not provide a complete explanation or understanding of the reaction mechanism.

Regardless of whether the explanation of the reaction mechanism is based on catalysis, electrochemistry or some combination of disciplines, data obtained provide the following general rules applicable to the present invention:

a. The oxidant and the reductant should be capable of forming an interface or boundry;

b. Flooding of the catalyst material should be avoided;

c. Both oxidant and reductant should be in contact with each other and the catalyst material; and d. Intermixing of the oxidant and reductant outside the locus or region of catalyst material should be avoided.

The procedures and system of the present invention involve a basically new concept and mode of operation in preparation of chemical materials by a reduction-oxidation reaction from reactants containing chemical elements of the desired product but in a valence state different from that in the desired product. This new operation involves the controlled contact of a fluid oxidant and a fluid reductant in which the contact is primarily at an interface in the locus of a solid catalyst material, the latter restricted contact being an essential element of the system. This controlled contact is in contradistinction to intermixing of the reactants as bubbles of gas in a liquid, as by a diffuser, and the reaction is carried out at that locus of contact between the oxidant, reductant and solid catalyst material. For the purpose of simplication, the following term has been developed to identify the process and the essential elements thereof.

"Contacogen" (trademark of The Mead Corporation, assignee of the present invention) means the electronically conductive solid material which forms the locus of the interfacial contact for the reductant and oxidant and which should be simultaneously contacted by them to produce the desired reaction, i.e., a catalyst.

Of particular interest is the fact that the present system offers unique advantages in the production of polysulfide for use in the treatment of lignocellulose material. This unique advantage derives from the fact that polysulfide can be readily and continuously produced at ambient conditions, although higher pressures, and higher temperatures below the decomposition temperature of the reactants or products may be used, and polysulfide is produced simultaneously with sodium hydroxide, without the need for regeneration of the oxidant.

Accordingly, it is a primary object of the present invention to provide a system for the production of polysulfide with a minimum concomitant production of thiosulfate involving an entirely new concept and mode of operation of redox processes.

Another object is the production of polysulfide on a batch or continuous basis by a reaction in which the oxidant is a gas and the reductant is an aqueous solution, and wherein both the oxidant and reductant are brought into interfacial contact with each other and simultaneously into contact with an electronically conductive solid catalyst material.

Another object of the present invention is the provision of a relatively simple apparatus for the production of polysulfide by a reaction in which a catalyst is maintained in a non-flooded condition but in contact with both the oxidant and reductant, the latter being in contact with each other substantially only in the region or locus of their contact with the catalyst.

Another object of the present invention is a system for generating polysulfide for use in pulping of lignocellulose materials, wherein both polysulfide and sodium hydroxide are produced.

Another object of the present invention is the provision of a system and apparatus for the production of polysulfide and sodium hydroxide by a reaction in which these reaction products are produced at the same member and wherein the membranes and barriers used in electrochemical procedures are avoided.

BRIEF DESCRIPTION OF THE DRAWINGS

FIG. 1 is a schematic illustration of a generator in accordance with the present invention;

FIG. 2 is a schematic illustration of a generator in accordance with the present invention in which there are separated dual product producing zones;

FIG. 3 is a simplified illustration of a generator in accordance with the present invention in which wet-proofed particulate catalyst material is floated on the surface of the reductant;

FIG. 4 is a schematic illustration of a continuous generator in accordance with the present invention in which the catalyst is maintained at the interface between the oxidant and reductant;

FIG. 5 is a diagrammatic illustration of another form of continuous generator in accordance with the present invention in which a plurality of trays are used, and wherein the catalyst is floated on the surface of the reductant;

FIG. 6 is a sectional view taken along the lines 6—6 of FIG. 5;

FIG. 7 is a diagrammatic illustration of a closed tower generator in accordance with the present invention, with portions broken away to expose the interior components thereof;

Fig. 8 is an enlarged fragmentary section taken along the lines 8—8 of FIG. 7;

FIG. 9 is an enlarged fragmentary section taken along the lines 9—9 of FIG. 7.

DETAILED DESCRIPTION OF THE INVENTION

Figure 10:
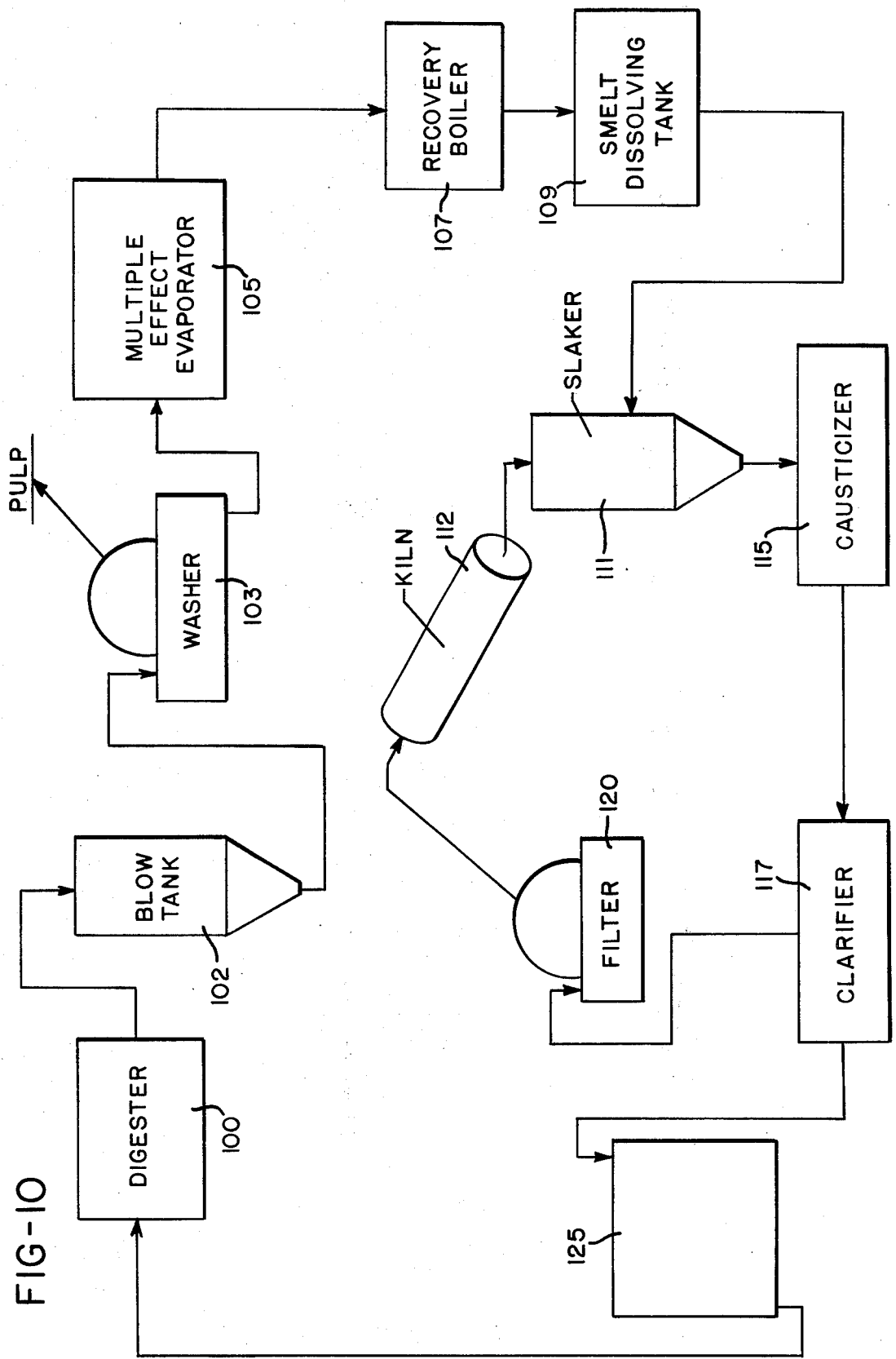
Fig. 10 is a schematic illustration of the use of the generator of the present invention in a pulp liquor recovery system

The reduction-oxidation system of the present invention in the case of sodium sulfide involves the following reactions:

|  | Oxidation |  |
|---|---|---|
| $S^- \longrightarrow S^o$ | $+ \quad 2e$ | (1) |
|  | Reduction |  |
| $2H_2O + O_2$ | $+ \quad 4e \longrightarrow 4OH^-$ | (2) |
|  | Combined |  |
| $2Na_2S + 2H_2O + O_2$ | $\longrightarrow 2S + 4\,NaOH$ | (3) |

The elemental sulfur then combines with the sodium sulfide to form $Na_2S_x$, the latter being polysulfide in which the value of $x$ is above 1 and as high as 4.5. These materials, however, may also react as follows:

$$2Na_2S_2 + 3O_2 \rightarrow 2Na_2S_2O_3 \tag{4}$$

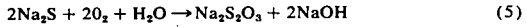

$$2Na_2S + 2O_2 + H_2O \rightarrow Na_2S_2O_3 + 2NaOH \tag{5}$$

In the case of polysulfide for use in treatment in lignocellulose material, it is desired to maintain the amount of thiosulfate to a minimum, and if possible, to prevent its formation. Thiosulfate is not an effective pulping chemical in alkaline pulping, and constitutes an undesirable load in the recovery system.

In the case of sodium hydrosulfide, which may be produced by absorption of hydrogen sulfide gas in an alkaline solution, the reactions are, for exlample:

$$H_2S + NaOH \rightarrow NaHS + H_2O \tag{6}$$

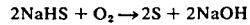

$$2NaHS + O_2 \rightarrow 2S + 2NaOH \tag{7}$$

The three essential components of the system of the present invention are an oxidant, a reductant, and a catalyst. The oxidant may be any gas which contains elemental oxygen, such as air, pure oxygen, or mixtures of oxygen and small amounts of chlorine and the like, although the amount of gases such as ozone should be limited if they attack or degrade the catalyst material. The reductant is an aqueous solution of sodium sulfide or the hydrosulfide and also constitutes an ionically conductive phase, although in accordance with this invention conductivity of this phase is not believed to be as significant a factor as it is in electrochemical fuel cell or electrolysis systems. The oxidant and reductant are also characterized by the formation of an interface or boundary when the two are brought into contact with each other.

The catalyst material, in accordance with the invention, is a solid which is essentially inert with respect to the oxidant, the reductant and products in the sense that it is not chemically attacked or reactive therewith. A material having a high surface area to weight ratio is preferred because is furnishes greater interfacial contact. The resistivity of the materials should be such that it will permit transference of the electrons involved in the reaction. Materials having a resistivity of less than about $10^5$ ohms-centimeters may be used although the preferred materials have a resistivity of $10^3$ ohms-centimeters or less.

To initiate and to control the reaction in accordance with the present invention, the reductant and the oxidant are brought into contact with each other and with the catalyst and maintained in the relation that the oxidant and reductant are in contact with each other substantially only in the same region where they are simultaneously in contact with the catalyst. An important aspect of the present invention is preventing the catalyst from being flooded by either the reductant or oxidant. If the catalyst is flooded by the liquid reductant, the liquid film slows considerably the rate of diffusion of the oxidant to the surface of the catalyst. Similarly, if the catalyst is flooded by the oxidant, the reductant is prevented from reaching the surface of the catalyst in the manner contemplated by the present invention. When operated in a non-flooded condition, as described above, it has been observed that the production of thiosulfate can be minimized, if not eliminated. This is particularly significant in view of the prior art reference to the fact that strongly alkaline sulfide solutions are not easily oxidized by air, the oxidation producing thiosulfate rather than polysulfide. The system of the present invention is thus a controlled oxidation by which sulfide is preferentially oxidized to sulfur rather than to thiosulfate thus providing a reaction product which, insofar as sulfide conversion is concerned, is predominantly polysulfide.

Since the reaction zone involves a gas, a liquid and the catalyst, the catalyst must be in contact with the gas and wetted by the liquid but not flooded by either. Wetted, as used here, means that the contact angle between the catalyst and the liquid is low, e.g., less than about 90° and approaching zero. If the contact angle is high, e.g., greater than about 90° and approaching 180°, then the liquid will tend to draw away from the surface of the catalyst, and the surface of the catalyst is in effect in substantial contact only with the gas, that is, flooded by the gas. On the other hand, with the surface of the catalyst readily wetted by the liquid, that is, with a contact angle approaching zero between the catalyst surface and the liquid, the liquid will tend to cover the surface of the catalyst, and the surface of the catalyst is in effect in substantial contact only with the liquid, that is, "flooded" by liquid. One method of preventing flooding, by the liquid is by a treatment of the catalyst which is designated as "wetproffing." This adds to the catalyst a minor proportion of an inert substance not wetted by the liquid reactant, that is, the contact angle between this inert additive and liquid is greater than about 90°.

In the case of porous materials used as a catalyst, it will be understood that the oxidant gas should not be forced through the pores of the catalyst in the sense that a porous member is used as a diffuser to form small oxidant gas bubbles which are in intermixing contact with the liquid.

Typical of the catalyst materials which may be used as carbon, activated carbon, platinized asbestos, nickel or carbon or activated carbon containing inclusions such as nickel, iron, cobalt, silver, platinum, palladium, manganese oxides (e.g., manganese dioxide), manganese sulfides, iron oxides and hydrated oxides, nickel oxide, nickel sulfide and cobalt sulfide or mixtures thereof. Of the above materials, carbon and activated carbon appear to provide optimum performance because of the relatively large surface-area-to-weight ratio and the simplicity with which inclusions of metals and compounds of metals may be introduced into the material, as well as the degree to which carbon may be finely divided. Moreover, this is a readily available material which may be obtained in a wide variety of particle sizes and surface areas. Carbons from different sources often result in different reaction rates. These variations are easily determined by simple procedures. Typical of the carbons useable in accordance with the present invention are carbon black, furnace black, channel black or carbons prepared by known procedures from various sources, for example, wood, corn cobs, beans, nut shells, bagasse, lignin, coals, tars, petroleum residues, bones, peat and other carbonaceous material. The particle size may vary from 9 millimicrons to relatively large size, e.g., 1 inch or more, and usually the carbon is supplied as a mixture of various particle sizes. The surface area of the carbonaceous material may vary from 3 square meters per gram to in excess of 950 square meters per gram, as characterized by gaseous absorption using the BET method.

The carbon may be arranged in various physical arrangements, e.g., a porous nickel substrate with powdered platinum covered by powdered carbon and wetproofing agent, all disposed on one side of the nickel substrate as described in "Fuel Cells," Prentice Hall, 1969, pp. 402–403; a porous carbon plate or tube wetproofed to prevent flooding, or a mass of wetproofed carbon granules or powder which float on the surface of the reductant, or a bed of catalyst particles of depth greater than the capillary rise of the reductant supported so as to be in contact with the surface of the reductant.

Carbon may be wetproofed as follows:

Polytetrafluoroethylene (PTFE) in emulsion form is intermixed with particulate carbon in an amount of between 0.1% to 100% based on carbon solids. The mixture is heated to remove the vehicle and dispersing agent for the PTFE. Another wetproofing method involves treating particulate carbon in the ratio of 1 gram of linear polyethylene per 10 grams of carbon. The polyethylene is dissolved in the ratio of 1 gram of polyethylene per 100 grams of hot toluene and poured over the carbon. After treatment, the carbon is heated at approximately 105° C to evaporate the toluene. The particles are not uniformly repellent but most of them are sufficiently repellent to float from several hours to several days.

Using the procedure described above, particulate carbon may also be wetproofed with polystyrene, fluorocarbon resins, polyethylene emulsions, silicones, or other hydrophobic materials, by any suitable procedure that avoids complete encapsulation by hydrophobic materials impermeable to the reactants or products formed. Other materials which may be used are polychlorotrifluoroethylene, prepolymerized silicone oils, and high vacuum silicone grease, for example.

Using the procedure described above, any of the heretofore mentioned catalysts, particulate carbon being only an example, may be wetproofed with polystyrene, polytetrafluoroethylene, polyethylene, silicones polychlorotrifluoroethylene, prepolymerized silicon oils, high vacuum silicone grease, poly (chloro-p-xylylene), paraffin, paratoluene sulfonamide, polydichlorodifluoroethylene, and octadecyl amine.

Another procedure includes subliming a chlorinated paraxylylene dimer in a vacuum chamber and depositing the vapors on materials such as particulate carbon and porous sintered nickel, thereby forming a poly(chloro-p-xylylene), known as "parylene".

In the case of materials such as finely divided platinum in an asbestos matrix, wetproofing is accomplished by using a 1% solution of polyethylene in toluene, wetting the asbestos matrix with the solution, draining off excess liquid then drying in an oven to evaporate the toluene.

In another example, paraffin wax is used in an amount varying from ½ to 2 grams per 10 grams of particulate carbon. The paraffin is dissolved in a solvent such as hexane or toluene, the carbon introduced into the mixture, heated and the solvent thereafter evaporated. Cetyl alcohol may also being used and applied in the same way. Any one of paratoluene sulfonamide, polydichlorodifluoroethylene and octadecyl amine may also be used and applied by intermixing with the carbon and heating the mixture to cause the treating material to adhere to the carbon. Each of the above materials operates satisfactorily in the new systems as indicated by the production of polysulfide which is visually detectable.

The particulate carbon may be bonded by a carboxylated styrene-butadiene latex used in an amount of 5 grams of 25% solids dispersion per 10 grams of carbon. The resulting material is a sheet which may be supported at the interface or a sodium sulfide solution and air, the reaction beingl apparent by the formation of the yellow color characteristic of polysulfide. In another example, polyethylene was dissolved in toluene, the polyethylene being used in the ratio of 5 grams per 10 grams of granular carbon and the toluene removed by floating the mixture on boiling water. The result was a bonded product which was sufficiently porous to permit passage of the oxygen containing gas and sufficiently wetproofed to float.

Referring to FIG. 1, which illustrates a preferred embodiment of the generating cell of the present invention, a polypropylene container 10 is equipped with an inlet 12 and an outlet 14 for introduction of aqueous reductant and removal of reaction products, respectively. Positioned within the container and forming one wall thereof is a catalyst 15 which may be a porous nickel substrate, platinum black and powdered carbon and wetproofing agent deposited on the side of the substrate contacting the reductant. The container 10 is also provided with an inlet 16 for gaseous oxidant and an outlet 17 therefor. The gaseous oxidant initially contacts the nickel side of the catalyst 15.

In operation, a two molar solution of sodium sulfide was circulated from a reservoir (not shown) through the solution space 19 by means of a pump (not shown) and then back to the same reservoir. The solution was maintained at a temperature of 50° C and gaseous oxidant, e.g., oxygen, was admitted to the gas space 20 from a pressure cylinder, a water column being used to maintain a pressure of about 16 inches of water on the gas in the gas space. Excess and unreacted oxygen was withdrawn through an exit 17. The exposed face of the catalyst was 7.5 square inches. After 65 hours of operation, 72.2 grams of polysulfide sulfur was formed along with 232 grams of sodium hydroxide. No thiosulfate was formed. This represents 50% sulfide to sulfur conversion.

In another form of the present invention, the catalyst 15 was ¼ inch thick porous carbon electrode, wetproofed as described. Operating conditions were as previously described and after 23 hours operation, 40.6 grams of sulfur was formed along with 112 grams of sodium hydroxide and 5.7 grams of thiosulfate. This represents 68% of the sulfide converted to sulfur and 4% converted to thiosulfate.

As is apparent, the apparatus shown in FIG. 1 may be oriented with the catalyst 15 disposed horizontally above the reductant merely by turning the entire apparatus 90°. In this form, the liquid level in the solution space is so maintained that the solution contacts the carbon face but does not flood the entire member 15. When so oriented, it may not be necessary to use a pressure system for the oxidant which is maintained in contact with the member 15.

In the form shown in FIG. 2, wherein the same reference numerals have been used where applicable, a variant is illustrated in which two separate catalyst members 15 and 15a are used to form facing walls of the container 10. The space between them forms the solution space 19, the reductant being introduced through inlet 12, and the reaction products removed through outlet 14. Oxidant inlet and outlets 16a and 17a, respectively are provided for member 15a, the latter being of the type previously described. After four hours of operation, as described in connection with the device of FIG. 1, 26.6 grams of sulfur and 83.6 grams of sodium hydroxide were formed. No thiosulfate was formed. In each case however, the formation of sulfur was indicated by the appearance of a yellow color, and a gradual darkening of the color as additional sulfur was formed and dissolved in the sodium sulfide to form the polysulfide. The nature of the reaction products was confirmed by analysis.

A simple arrangement for practicing the present invention on a batch basis, and for evaluating catalysts is illustrated in FIG. 3 in which a container 25 includes reductant 26. The catalyst 29 is in the form of particles which float on the surface of the reductant and which are simultaneously in contact with the oxidant gas, e.g., air.

In one example, sodium sulfide solution was introduced into the container, and carbon, removed from the face of a fuel cell electrode, was used as the catalyst. Activity was apparent by the appearance of a yellow color and heat generated at the interface. Analysis of the carbon showed the presence of fluorocarbon resin, copper, nickel, cobalt and iron, the latter metals in trace amounts. The reductant solution originally contained 62 g/l of sulfide sulfur and 169 g/l of total alkali reported as NaOh. A trace of thiosulfate was also present. This solution was allowed to stand, without stirring at room temperature for three days with the carbon floating on the surface of the reductant, and then analyzed. The results were 9 g/l of sulfide sulfur, 30.7 g/l of polysulfide sulfur, 34.5 g/l of sulfur in the form of thiosulfate ($S_2O_3^{--}$). Total alkali was 142.8 g/l calculated as sodium hydroxide. For the purposes of this invention, each polysulfide ion, $S_x^{--}$, is defined as consisting of one atom of sulfide sulfur, that is, $S^-$, and $x-1$ atoms of polysulfide sulfur, that is, $S_{x-1}^0$. The value of X is calculated from the amounts of sulfide sulfur and of polysulfide sulfur by the formula, $X = (S^{--} + S^0)/S^{--}$, that is, the ratio of sulfide sulfur + polysulfide sulfur to sulfide sulfur.

A second sample of the same reductant solution was used and after 1 hour and 15 minutes at room temperature the analysis was as follows: 47.2 g/l sulfide sulfur, 11.2 g/l of polysulfide sulfur and no thiosulfate ($S_2O_3^{--}$). Total alkali was 161.6 g/l as NaOh. After 4 hours the analysis was 29.3 g/l of sulfide sulfur, 21.1 g/l of polysulfide sulfur and no thiosulfate ($S_2O_3^{--}$). The total alkali was 157.2 g/l expressed as NaOh.

The results above are summarized in a table as follows:

| Time | *S= | *$S_{x-1}^0$ | *$S_2O_3^=$ | X Value |
|---|---|---|---|---|
| 1.25 hours | 47.2 | 11.2 | 0.0 | 1.24 |
| 4.0 hours | 29.3 | 21.1 | 0.0 | 1.75 |
| 72.0 hours | 9.0 | 30.7 | 34.5 | 4.23 |

*Concentrations, grams/liter as sulfur

Water treatment grade of activated carbon was rendered water repellent by using polyethylene as described above. The floating bed system of FIG. 3 was used, the data being as follows:

| Time | *S= | *$S_{x-1}^0$ | *$S_2O_3^-$ | X Value |
|---|---|---|---|---|
| 5 hours | 56.1 | 5.6 | 0.0 | 1.10 |
| 24 hours | 40.3 | 22.2 | 0.0 | 1.55 |

*Concentrations, grams/liter as sulfur

It was demonstrated by the use of columns packed with particulate carbon that a sufficiently high degree of wetproofing would prevent flooding and maintain a continuous production of polysulfide, even under a hydrostatic head. Comparisons of carbon in this manner showed that virtually no polysulfide was generated with non-wetproofed carbon, while large amounts of thiosulfate were produced. The basic procedure involved 100 grams of 2M sodium sulfide solution in a one inch diameter glass column having a glass diffuser in the base. Air was bubbled into the column at the rate of 250cc per minute for 2 hours. The data are as follows:

| Test | Catalyst | Wetproofing | *S⁼ | *S$_{x-1}$° | *S$_2$O$_3$⁼ | X Value |
|---|---|---|---|---|---|---|
| 1 | None | — | 53.8 | 0.0 | 10.2 g/l | 1.00 |
| 2 | carbon | none | 51.0 | 1.1 | 11.9 g/l | 1.02 |
| 3 | carbon | 2%PTFE | 20.2 | 34.2 | 9.6 g/l | 2.69 |
| 4 | carbon | 20%PTFE | 48.4 | 15.6 | 0 | 1.32 |

*Concentrations, grams/liter as sulfur

These data suggest that optimum operation of the system of the present invention involves maintaining the catalyst at the interface of the oxidant and reductant, and maintaining the oxidant in contact with a non-flooded surface portion of the catalyst.

Whatever the explanation for these unique results, it is clear that by flooding the surface of the catalyst, the rate of oxidation is substantially reduced. Furthermore, the results are additionally unique in that such oxidation as does occur when the surface of the catalyst is flooded raises the oxidation state of the sulfur too high, to thiosulfate, whereas the desired reaction which occurs rapidly with the non-flooded wetproofed catalyst raise the oxidation state of the sulfur only to polysulfide. An explanation of this behavior in a column configuration using a non-wetproofed material, wherein the polysulfide production is negligible and the thiosfulfate product is larger, may be that there is a direct reaction between the oxidant and the reductant which does not involve the catalyst.

It has been observed that when the sulfide solution is maintained for too long a time in the vicinity of the oxidative situs, the oxidation product is thiosulfate to an undesirable degree, increasingly so as to the time of reaction is increased. In a column configuration, the time for reaction may be conrolled by the rate of throughput of the sulfide solution, the faster the throughput the shorter the reaction time. The following analyses of effluent solutions from the bottom of a particular column through which air flowed countercurrently upward, show that with a certain catalyst the throughput should be maintained above the level at which thiosulfate is produced. Companion data below show that unless the catalyst has been wetproofed, the rate of oxidation is relatively very low.

| Throughput cc/hour | *S⁼ | *S$_{x-1}$° | *S$_2$O$_3$⁼ |
|---|---|---|---|
| Carbon Wetproofed with 10% PTFE | | | |
| 22 | 1.9 | 8.5 | 50.5 |
| 45 | 3.7 | 11.8 | 42.8 |
| 116 | 9.9 | 31.8 | 21.7 |
| 188 | 25.4 | 32.8 | 0.0 |
| 256 | 31.8 | 26.8 | 0.0 |
| 370 | 36.6 | 17.9 | 3.2 |
| Same Carbon Untreated | | | |
| 40 | 57.3 | 1.0 | 2.6 |

-continued

| Throughput cc/hour | *S⁼ | *S$_{x-1}$° | *S$_2$O$_3$⁼ |
|---|---|---|---|
| 130 | 63.2 | 0.5 | 0.0 |
| 159 | 58.9 | 0.8 | 2.6 |
| 326 | 63.4 | 1.0 | 0.0 |

*Concentrations, grams/liter as sulfur

The amount of wetproofing material with which the catalyst should be treated may be varied from less than 1 percent of the weight of the catalyst to greater than 99 percent. Lower or higher percentages of wetproofing material appear to serve no useful purpose, because the area of contact available to one fluid phase is diminished excessively relative to that available to the other. The exact proportion of wetproofing material is best determined by experiment for a particular catalyst to be used in a particular apparatus, depending upon the practical results desired.

By way of example, the amount of PTFE used to treat an activated carbon was varied, the several wetproofed carbons so prepared being packed into respective glass columns of 1⅞ inch diameter to a depth of 16 inches. Sodium sulfide solution approximately two molar in concentration was flowed at a regulated and measured volume rate downward through the columns, and a large chemical excess of air was flowed at a constant volume rate upward, countercurrently. In separate experiments, the rate of flow of the sulfide solution was adjusted to different levels, and, after the operation had been continued long enough to reach steady conditions, samples of effluent solution were collected and analyzed. The following table shows the analytical results from these experiments, with the respective values of amount of wetproofing PTFE on the carbon and the dwell time in the column, the later being proportional to the inverse of throughput, equal in minutes in these experiments to 43,440 divided by cc per hour.

| Dwell Time in Column-minutes | %PTFE Used for Wetproofing Carbon | | | | | | | | | | | |
|---|---|---|---|---|---|---|---|---|---|---|---|---|
| | 0 | | | 2 | | | 5 | | | 10 | | |
| | S⁼ | S$_{x-1}$° | S$_2$O$_3$⁼ | S⁼ | S$_{x-1}$° | S$_2$O$_3$⁼ | S⁼ | S$_{x-1}$° | S$_2$O$_3$⁼ | S⁼ | S$_{x-1}$° | S$_2$O$_3$⁼ |
| 33 | *— | — | — | 40.6 | 14.1 | 1.3 | — | — | — | — | — | — |
| 46–48 | — | — | — | 32.3 | 24.3 | 2.6 | 35.2 | 21.4 | 2.6 | 36.2 | 24.6 | 0.0 |
| 53–54 | 50.6 | 1.9 | 0.0 | — | — | — | 25.9 | 28.2 | 9.0 | — | — | — |
| 64 | — | — | — | — | — | — | — | — | — | 27.2 | 29.1 | 0.0 |
| 69 | — | — | — | 18.2 | 25.9 | 10.2 | — | — | — | — | — | — |
| 72 | — | — | — | — | — | — | 17.9 | 32.6 | 16.6 | — | — | — |
| 77 | 53.1 | 1.6 | 1.3 | — | — | — | — | — | — | — | — | — |
| 84 | — | — | — | — | — | — | — | — | — | 18.6 | 34.6 | 7.7 |
| 102 | — | — | — | — | — | — | — | — | — | 11.8 | 27.5 | 35.8 |

Values in the body of the table are concentrations, grams/liter as sulfur
*Dashes indicate no data collected By inspection of this table, it may be seen that if minimum dwell time in the column is a primary criterion, with maximum production of polysulfide sulfur as a secondary criterion, then either 2, 5 or 10 percent of wetproofing PTFE on the carbon give approximately the same results. On the other hand, if maximum production of polysulfide sulfur is a primary criterion, with minimum production of thiosulfate sulfur as a secondary criterion, then 10 percent of wetproofing PTFE on the carbon gives the best results in these experiments. In two experiments, the column was operated with activated carbon without wetproofing material, and the results above show that the production of oxidized sulfur products was greatly diminished relative to that when PTFE was present in amounts of 2, 5 or 10% on the carbon.

A simple arrangement for practicing the present invention on a batch basis and for evaluating catalysts is illustrated in FIG. 3, in which container 25 includes liquid reductant 26. The catalyst 29 is in the form of particles which float on the surface of and are supported by the liquid reductant and which are simultaneously in contact with the gaseous oxidant. The particular arrangement of FIG. 3 may be used with a catalyst which is supported at the interface, and a convenient effective means to accomplish this is to wetproof the catalyst, for example, wetproofed particulate carbon. In this way a floating bed configuration is achieved in which the catalyst is maintained at the interface formed between the two reactants.

Referring to FIG. 4, a container 30 is provided with an inlet 31 for introducing the reductant 32 and an outlet 33 for removing the reaction products and unreacted reductant. Positioned within the container 30 is screen element 34 arranged with respect to the level of reductant 32 in the container 30 so as to contact the underside of the screen 34, and by proportioning the thickness of the bed of catalyst material 35 so that its vertical height is greater than the capillary rise of the reductant, thus preventing flooding of the catalyst by the reductant, the free surface portion 36 of the catalyst material is continually exposed to oxidant (air) and operates in essentially the same manner as a floating bed. The catalyst 35 may take several forms in the arrangement of FIG. 4, for example, a porous carbon plate made up of bonded porous carbon particles which are supported either by a screen or some other convenient arrangement. Depending upon size, cross-section and strength of the plate, it can be fabricated to be self-supporting thus eliminating the use of supporting screens and other structures. This arrangement, like those previously described, assures that any oxidant contacting the reductant must also come in contact with the catalyst.

Another form of the apparatus is shown in FIGS. 5 and 6 in which the generator 45 includes a plurality of vertically stacked tray elements 46 supported in spaced relation by members 47. In the embodiment shown, there are four trays although it is understood that a greater or lesser number of trays made be used. Each tray is provided with a plurality of spaced divider elements 48 extending from one wall 49 of the tray. The divider elements 48 terminate short of opposing wall 51. Extending from opposing wall 51 is a second plurality of divider elements 53, these terminating short of the wall 49. Reductant is introduced into the tray through an inlet 55, and due to the arrangement of dividers 48 and 53, travels in a serpentine fashion to tray outlet 56 which permits the reductant material to flow into the next lower tray. In this manner, the reductant travels from one tray to the next and is finally withdrawn through an exit line 57.

The reaction is carried out in the presence of a catalyst which may, for example, be polytetrafluoroethylene (PTFE) wetproofed particulate carbon which floats on the surface of the reductant much in the same fashion described in connection with FIG. 3. The apparatus of FIGS. 5 and 6, however, represents a continuous system in which fresh reductant is introduced in the inlet 55 and removed at the outlet 57. The catalyst which is in particulate form is prevented from migrating through the generator by baffle elements 60, so positioned in the path of reductant travel to permit passage of the reductant thereunder while maintaining the catalyst stationary. The oxidant is air circulated between the trays.

In a typical test, eight 2 × 4 feet trays in series were operated continuously for a period of 5 ½ hours. The feed rate was 430 to 490 cubic centimeters per minute of aqueous sodium sulfide solution approximately 64.6 grams per liter of sulfide expressed as sulfur. The feed temperature was approximately 130° F, and the effluent from each tray was analyzed for concentration, percentage conversion and X value. The data are shown in the following table:

| Tray | *S⁼ | *S$_{x-1}$° | *S$_2$O$_3$⁼ | % Conversion | X Value |
|---|---|---|---|---|---|
| Feed | 64.6 | — | — | 0 | 1.00 |
| 1 | 59.0 | 5.1 | 0 | 8.2 | 1.09 |
| 2 | 51.0 | 12.5 | 0 | 19.4 | 1.24 |
| 3 | 43.9 | 19.9 | 0 | 31.0 | 1.45 |
| 4 | 34.6 | 28.2 | 0 | 44.8 | 1.81 |
| 5 | 31.1 | 33.0 | 0 | 51.5 | 2.06 |
| 6 | No data collected | | | | |
| 7 | 27.2 | 36.2 | 0 | 57.0 | 2.33 |
| 8 | 25.3 | 37.2 | 0 | 59.5 | 2.47 |

*Concentration, grams/liter as sulfur

In a second series of tests, a feed rate of 400 cubic centimeters per minute was used at a feed temperature of 120° F the unit being run continuously for 28 hours. The data were collected as described above and are as follows:

| Tray | *S⁼ | *S$_{x-1}$° | *S$_2$O$_3$⁼ | **% Conversion | X Value |
|---|---|---|---|---|---|
| Feed | 31.9 | — | — | 0 | 1.00 |
| 1 | 25.8 | 5.9 | 0 | 18.7 | 1.23 |
| 2 | 20.4 | 10.9 | 0 | 34.6 | 1.53 |
| 3 | 17.0 | 14.2 | 0 | 45.6 | 1.84 |
| 4 | 14.9 | 15.9 | 0 | 51.5 | 2.06 |
| 5 | 13.3 | 16.5 | 0 | 55.3 | 2.24 |
| 6 | 12.3 | 18.4 | 0 | 59.8 | 2.49 |
| 7 | 11.5 | 19.1 | 0 | 62.4 | 2.65 |
| 8 | 10.7 | 19.9 | 0 | 65.0 | 2.85 |

*Concentrations, grams/liter as sulfur
**Cumulative percent of sulfide converted to polysulfide These data are significant because of the large quantities of polysulfide generated in the absence of thiosulfate, using a generator of the type shown in FIGS. 5 and 6. It is also significant that the generator 45 operated continuously for an extended period of time without apparent loss of activity of the catalyst thus obviating the necessity for regeneration.

Referring to FIGS. 7 to 9, a closed tower generator 75 is shown and includes a plurality of vertically stacked tray elements 76, four being shown, although more or less may be used, as desired. In this arrangement, each tray of polypropylene, stainless steel or other suitable material includes a plurality of spaced divider elements 77 extending from one end wall 78 and terminating short of the other end wall 79, Extending from wall 79 are a second series of spaced divider elements 80 which terminate short of wall 78. The divider elements 77 and 80 form flow channels for the reductant and oxidant. Oxidant is introduced through inlet 81 provided in the top cover 82 while reductant is introduced through inlet 84 also in the top cover. A reductant inlet chamber 85 is formed by baffles 86 and 87 which span the space between the adjacent side wall and the adjacent divider element 80. The baffles terminate short of the cover 82 so as to provide a space for passage of oxidant, while baffle 87 is spaced from the bottom of the tray to permit flow of the reductant under the baffle. Adjacent to the reductant inlet chamber is an oxidant inlet chamber 88 defined by the baffle 86 and end wall 79.

Unreacted reductant and product and some residual oxidant are withdrawn from an outlet 89 provided in chamber 85a formed by baffles 86a and 87a corresponding in structure to baffles 86 and 87. The top of outlet 89 extends above the bottom of baffle 87a, as illustrated in FIG. 9, in order to raise the level of reductant such that the catalyst 90 in the form of wetproofed particulate carbon is prevented from flowing from one tray to the next. Oxidant passes over the tops of baffles 86a and 87a to an oxidant outlet chamber 88a and through the outlet 91 to the next lower tray. For simplicity each tray is of essentially the same construction, with the passageways 89a and 91a at the inlet end of the tray being plugged or sealed as shown in FIG. 8. Thus, as reductant and oxidant flow into the next lower tray, both oxidant and reductant travel in a direction opposite to that of the tray above and exit through chambers corresponding in location and structure to chambers 85a and 88a. At the last tray, unused oxidant, if any, and the remaining gases are withdrawn from tower outlet 92 while unused reductant and products are withdrawn from tray outlet 93.

The cover 82 is so sealed to the top tray by seal elements as to form a continuous flow channel between the dividers and walls, ad indicated in FIG. 7. The bottom of the top tray forms the cover for the tray below it, the top tray being provided with a separate cover. The trays are sealed by seal elements 95 which may take various forms. In the form illustrated in FIGS. 7-9, the seal elements are in the form of resilient members adhered to the top of the dividers 77 and 80 and to the top of the side and end walls of each tray. In this way positive control of oxidant feed rate can be maintained and the system may be pressurized if desired.

Usng a tower generator of the type shown in FIGS. 7-9, air oxidant was fed at a rate of 44 liters/minute while reductant was fed at the rate of 400cc/min. The reductant was an aqueous sodium sulfide solution containing 61.5 g/l of sulfide sulfur while PTFE wetproofed particulate carbon was used as the catalyst and floated on the surface of the reductant. The data are as follows:

| Tray | Inlet Temp. ° F | *S= | *$S_{x-1}$= | *$S_2O_3$= | % Conversion | X Value |
|---|---|---|---|---|---|---|
| Feed | | 61.5 g/l | | | | |
| 1 | 138° | 62.1 g/l | 0 | 0 | 0 | 1.0 |
| 2 | 136° | 60.5 g/l | 0 | 0 | 0 | 1.0 |
| 3 | 147° | 57.4 g/l | 1.6 | 0 | 3.0 | 1.03 |
| 4 | 183° | 52.5 g/l | 3.5 | 0 | 6.5 | 1.07 |
| 5 | 195° | 45.1 g/l | 11.2 | 0 | 20.0 | 1.25 |
| 6 | 193° | 28.2 g/l | 28.5 | 0 | 50.2 | 2.01 |

*Concentration, grams per liter as sulfur

The oxidant was air of about 21% oxygen content and the oxygen content of the gas taken from outlet 93 was found to be about 9%. The dwell time was about 90 minutes for the six trays or 15 minutes for each tray. Total running time was about 6 hours of continuous operation.

The closed apparatus of FIGS. 7-9 provides advantages in practicing the present invention, for example, the heat generated during the exothermic reaction may be used as a low temperature heat source by the use of heat exchanger assembly associated with the tower. Moreover, reaction conditions and temperature may be controlled by adjustment of oxidant and reductant feed rates. Oxidant compositions may be controlled. Countercurrent flows may be employed if desired. A portion of the tower may be heated to increase the rate of reaction using heat generated in other portions of the tower, or by a separate source. Cooling of selected portions of the tower is possible if found to be advantageous. It will also be apparent that the tower may take other forms.

In view of the fact that the reaction is exothermic it will be apparent that if wetproofed materials are used as the catalyst the wetproofing material should be stable at the temperature encountered.

Other variables which affect the operation of the apparatus shown in FIGS. 7-9 include oxidant concentration, feed rate and velocity, degree of wetpoofing of the particulate carbon or other catalyst. Since the amount of oxygen is reduced considerably when air is used as the oxidant, the exit gas may be further treated using the system of the present invention to provide an inert gas composition which is nitrogen rich and oxygen depleted, although it is understood that other systems may be used to remove the remaining oxygen. For example, the outlet gas may be passed through a second generator of the type shown in FIG. 7. It is also possible to control reaction conditions for efficiency of oxygen reduction rather than efficiency of polysulfide production.

The rate and/or efficiency of the system of the present invention may be increased by use of inclusions and the like with the catalyst. For example inclusions of metals and compounds of metal in the particulate carbon appear to increase the rate of reaction over that which occurred using the same carbon without inclusions. The inclusions may be provided as described in the following:

Cobalt sulfate was dissolved in water in the ratio of 0.5 grams per 100 milliliters of water. Particulate carbon was added in an amount of 10 grams per 100 milliliters of solution. The resultant mixture was heated to boiling and then dried in an oven at 110° C. The solid material was then treated with sodium hydroxide to precipitate an insoluble cobalt material, the solids thereafter filtered and washed with 0.1 normal sodium hydroxide. The carbon was then soaked in sodium sulfide solution for 4 hours, filtered and washed with hot water three times and then dried again at 110° C.

Manganous nitrate was dissolved in slightly acidic solution in the ratio of 0.5 grams per 100 milliliters of water acidified with 0.1 grams of nitric acid. The remaining treatment was the same as described in connection with cobalt sulfate.

The same procedure described immediately above was utilized except that the inclusion was derived from ferric sulfate dissolved in 0.1 normal sulfuric acid.

Nickel sulfate, silver nitrate, and chloroplatinic acid were individually used and processed to form inclusions as above described.

All such inclusions were observed to increase the rate of the reaction over that attained without the inclusions.

One of the principal advantages of the system of the present invention lies in its use as a generator of polysulfide pulping liquor in the processing of lignocellulose material such as wood for pulp and the like. Referring to FIG. 10, which shows an alkaline pulping system, chemically cooked pulp from a digester 100 is withdrawn through a blow tank 102. The pulp and spent liquor are then processed on a washer 103, the pulp being separated from the spent liquor as indicated, the latter referred to as black liquor. The black liquor, as is customary in the pulping industry, is processed to recover pulping chemicals for reuse.

This processing typically consists of feeding the black liquor to a multiple-effect evaporator 105, the output of the evaporator being fed to a recovery boiler 107 in which the organic solids are consumed to produce heat and inorganic sulfide-containing smelt which is then introduced into a smelt dissolving tank 109. The output of the smelt dissolving tank is green liquor which is an aqueous solution mainly of sodium sulfide and sodium carbonate. The green liquor is fed to a slaker 111 into which is fed calcium oxide from kiln 112. The mixture from the slaker passes to the causticizer 115 in which is completed the precipitation of calcium carbonate and the formation of sodium hydroxide. The resulting mixture is fed to a clarifier 117 which removes the lime sludge consisting principally of calcium carbonate, the sludge being passed through a filter 120 and then to a kiln 112 which converts the calcium carbonate to calcium oxide, the latter being cycled to the slaker 111 for conversion to calcium hydroxide. The output of the clarifier 117 is white liquor, an aqueous solution mainly of sodium hydroxide and sodium sulfide.

The polysulfide generator of the present invention may be easily brought into the system illustrated in FIG. 10 by taking the output of the clarifier 117 and flowing it through a polysulfide generator of the type previously described, as illustrated at 125. The input of the generator 125 is white liquor. The output of the generator is an aqueous solution mainly of polysulfide and sodium hydroxide which can be used as a pulping liquor.

The pulping liquor from the generator may be used directly in the digester if desired pulping conditions call for liquor of the chemical content being produced, or the content and concentration of the liquor from the generator may be adjusted by chemical addition. For dilution, water may be added continuously in controlled amounts, or the liquor from the generator may be fed to a holding tank, and the concentration adjusted by addition of water and the like. Make-up chemicals may also be added to the system to provide the desired composition. For example, any one of caustic, sulfur, hydrogen sulfide gas or sodium sulfide may be added to the reductant before entering the generator or to the generated liquor before or as it enters the digester, or can be added separately to the digester. Sodium carbonate may be added before the causticizing system while sodium sulfate may be added ahead of the recovery boiler. Sodium hydrosulfide and sodium polysulfide may be added at any of the places that sulfur may be added, supra, although either sodium sulfite or thiosulfate may be added before the recovery boiler. It will be apparent to those skilled in the art that the above modifications may be made alone or in combination and other materials may also be added such as penetration aids and/or pitch control agents.

The liquor from the generator may also be used in chip pretreatment or in semi-chemical pulping or for deodorization of "off" gases. It is also possible in accordance with this invention to admix the liquor from the generator with white liquor, green liquor or black liquor, or mixtures thereof. The input to the generator may be white liquor, or sodium sulfide with or without sodium hydroxide, black liquor, green liquor or mixtures thereof. The starting reductant may come from any source in the pulping system since all that is needed is a source of sulfide or hydrosulfide. For example, kraft black liquor fortified with sodium sulfide solution was treated in accordance with the present invention. The analysis of this fortified black liquor showed 58 grams/liter of sulfide sulfur, no polysulfide sulfur, and 154 grams/liter of total alkali as NaOH. One gram of activated particulate carbon treated with polyethylene was floated on the surface of the resulting mixed solution, and with air as the oxidant, the reactants stood undisturbed for 12 hours. At the end of this time, the analysis was as follows: sulfide sulfur 41.2 grams/liter, polysulfide sulfur 12.3 grams/liter and alkali as NaOH 174.4 grams/liter. The presence of black liquor interfered with with usual determination of thiosulfate. Evidently the catalyst-promoted oxidation of sulfide to polysulfide has proceeded with the black liquor present.

In another example, 500 grams of kraft black liquor containing residual sulfides were poured into a tray to make a layer about ¾ inches deep. The surface of the black liquor was covered by 8 × 30 mesh activated particulate carbon treated with 2% PTFE in the amount of 22 grams per 100 square inches of liquor area.

Five hundred grams of black liquor were poured into a similar tray and used as a control The progress of sulfide oxidation was followed analytically with the following results.

| Time of reaction; hours | Wetproofed Catalyst | | | Control - No Catalyst | | |
|---|---|---|---|---|---|---|
| | 0 | 1 | 2 | 0 | 1 | 2 |
| Sulfide* | 2.1 | 0.22 | trace | 2.1 | 0.80 | 0.29 |
| Polysulfide Sulfur* | 0.0 | 0.33 | 0.22 | 0.0 | 0.00 | 0.00 |
| X Value | 1.0 | 1.45 | — | 1.0 | 1.0 | 1.0 |
| Odor of Sample | Strong | Slight | Very Slight | Strong | Strong | weak |

*Concentration, grams per liter as sulfur

These data show that polysulfide had been produced from the sulfide in the black liquor only in the presence of the wetproofed catalyst and that the rate of sulfide oxidation was most rapid in its presence. Again the intense color of the black liquor interfered with an accurate determination of the thiosulfates present.

Kraft black liquor is normally malodorous due to the presence of mercaptans and organic sulfides and pulp mills go to great lengths to eliminate this odor. The amount of these malodorous compounds was greatly reduced in the oxidized black liquor in contact with the wetproofed catalyst. The odor tests were made by three observers who individually rated to odor of the air layer immediately above the liquor layer.

The ability to process black liquor is significant since it is also possible in accordance with the present invention to control the concentration of polysulfide in the cooking liquor in the digester by recirculating some of the used cooking liquor through a polysulfide generator arranged with the digester such that a portion of the cooking liquor is withdrawn therefrom, flowed through the polysulfide generator and reintroduced to the digester. Regardless of the specific arrangement, it is advantageous to avoid introduction of air into the polysulfide liquor, because of the tendency to convert polysulfide to thiosulfate.

The following example illustrates the use of polysulfide pulping liquors which can be prepared using the systems of the present invention. Between 1% and about 10% polysulfide sulfur based on oven dry (O.D.) weight of wood chips may be used with various types of wood chips. Cooking liquor is poured over the chips in the digester and water is added to bring the liquor/wood ratio to about 4:1 to 4.5:1. The digester is sealed and the liquor heated as rapidly as possible to 100° C by circulating through a heat exchanger. Trapped air is released and cooking continued as indicated. Evaluation is preferably made on a batch basis of about 5000 O.D. grams of chips.

EXAMPLE

A kraft or alkaline pulping liquor was synthesized by dissolving $Na_2S$ flakes in caustic. Analysis of the synthesized liquor showed concentration of active alkali of 126.8 g/l, of total alkali of 132.7 g/l, and of $Na_2S$ of 77.5 g/l, all expressed as $Na_2O$. This liquor was then processed through a polysulfide generator in accordance with the present invention, the generator being of the type generally shown in FIGS. 3 and 4 to provide a liquor having a concentration:

| | |
|---|---|
| $Na_2S$ as $Na_2O$ | 34.1 g/l |
| Polysulfide sulfur | 12.0 g/l |
| NaOH as $Na_2O$ | 76.9 g/l |
| A mass of softwood chips was prepared including: | |
| Balsam Fir | 38% |
| Red Pine | 16% |
| Jack Pine | 19% |
| White Pine | 19% |
| Hemlock | 8% |

Following the usual procedures $Na_2S$ and caustic were added in an amount sufficient to provide the indicated sulfides and active alkali. This chip mass then was cooked under the following conditions:

```
20% Active alkali as Na2O
25% Sulfidity
4:1 liquor/wood ratio (liters/kilogram)
1.75% polysulfide as S (OD wood basis)
90 minutes from 100° C to 170° C
90 minutes at 170° C
```
Screening data, obtained as previously described, was as follows:

| | |
|---|---|
| Percent screened pulp (14 cut screen) | 48.73% |
| Percent shives | 0.42% |
| Total yield | 49.15% |
| K lbs. Average | 22.0 |

The washed pulp was bleached using the sequence of chlorination, caustic extraction, chlorine dioxide, caustic extraction and treatment with chlorine dioxide. Following the bleaching operation, pulp was refined and handsheets were evaluated. The data are as follows:

| C.S. Freeness | 535 | 460 | 330 | 270 |
|---|---|---|---|---|
| Tear Factor | 100.6 | 93.6 | 87.9 | 81.9 |
| Burst Factor | 80.3 | 84.3 | 87.7 | 86.8 |
| Tensile | 20.9 | 21.8 | 23.1 | 22.4 |
| BLM | 10,488 | 10,774 | 11,485 | 11,327 |
| Fold | 1460 | 2092 | 2597 | 2866 |
| Bulk | 1.35 | 1.33 | 1.29 | 1.32 |
| Opacity | 61.6 | 57.8 | 56.9 | 53.2 |
| Brightness* | 84.8 | 84.0 | 82.2 | 79.0 |
| *-continued* | | | | |
| C.S. Freeness | 535 | 460 | 330 | 270 |
| Basis Weight OD | 60.26 | 61.19 | 60.82 | 59.80 |

*TAPPI T452m-58

The upper limiting amount of polysulfide sulfur that may be formed depends upon the amount of sodium sulfide present in the reductant and may be as much as approximately 100 g/l. Obviously there is no lower limit to the amount of polysulfide sulfur. The production of sodium hydroxide will vary in proportion to the production of polysulfide sulfur. Practical significance attaches to the fact that the use of polysulfide in amounts of as little as 1% based on the oven dry weight of wood produced an increase in yield when compared to kraft processing. Here the present invention finds its unique advantage, in a system for the production of polysulfide usable in treatment of lignocellulose material, because, compared to the systems of the prior art, it is relatively simple and offers the advantage of adaptation to presently existing kraft pulping and liquor recovery systems.

While the description of the present invention has been made primarily with reference to conversion of sodium sulfide or sodium hydrosulfide, the present invention may also be practiced with the use of hydrogen sulfide gas because the hydrogen sulfide can be absorbed in sodium hydroxide to form sodium sulfide, or sodium hydrosulfide. In the pulping field, hydrogen sulfide is obtained from dissolved smelt, carbonated liquor, the digester, evaporators, blow tank, and black liquor oxidation tower.

It will also be understood that treatment of lignocellulose materials is not limited to full chemical cooking. The product of the system of the present invention may also be used in semi-chemical processing, chip impregnation and nay of the other treatments of chips and the like normally used to effect partial or complete separation of lignins and cellulose, or any of the preparatory treatments.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:
1. In a process for production of sodium polysulfide and sodium hydroxide from sodium sulfide or sodium hydrosulfide, wherein said sodium polysulfide and sodium hydroxide is used in the treatment of lignocellulose material, the steps consisting essentially of:
1. providing a gaseous oxidant, an aqueous reductant containing sodium sulfide or sodium hydrosulfide, and particulate activated carbon, having a particle size of between 9 millimicrons and one inch and having a surface area of from 3 square meters per gram to in excess of 950 square meters per gram (BET), and which has been partially encapsulated with 0.1 – 100% by weight of carbon of a polytetrafluoroethylene resin,
said oxidant and reductant being capable of forming an interface when brought into contact with each other, said partially encapsulated carbon particles being relatively free from chemical attack by said oxidant, said reductant, and said reaction products, and 2. bringing said oxidant, reductant and partially encapsulated carbon particles into contact with each other, thereby effecting the oxidation of sodium sulfide or sodium hydrosulfide, producing sodium polysulfide and sodium hydroxide.

2. The process of claim 1 wherein said particulate carbon contains as an inclusion thereon a material selected from the group consisting of nickel, platinum, manganese oxides, manganese sulfides, iron oxides, hydrated iron oxides, nickel oxide, nickel sulfide, cobalt sulfide, and mixtures thereof.

3. The process of claim 1 wherein said particulate activated carbon has been partially encapsulated with approximately 2% by weight of carbon of a polytetrafluoroethylene resin.

4. The process of claim 1 wherein said particulate activated carbon has been partially encapsulated with approximately 5% by weight of carbon of a polytetrafluoroethylene resin.

5. The process of claim 1 wherein said particulate activated carbon has been partially encapsulated with approximately 10% by weight of carbon of a polytetrafluoroethylene resin.

6. The process of claim 1 wherein said reductant is selected from the group consisting of white liquor, green liquor, black liquor and mixtures thereof.

7. The process of claim 6 wherein said reductant is provided by treating green liquor recovered from a smelt tank with slaked lime to produce white liquor, said white liquor including dissolved sodium sulfide and sodium hydroxide and constituting said reductant which upon oxidation provides a pulping liquor containing sodium polysulfide.

* * * * *